(12) United States Patent
Lear

(10) Patent No.: US 7,757,276 B1
(45) Date of Patent: Jul. 13, 2010

(54) METHOD FOR VERIFYING CONFIGURATION CHANGES OF NETWORK DEVICES USING DIGITAL SIGNATURES

(75) Inventor: Eliot Lear, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1366 days.

(21) Appl. No.: 10/822,927

(22) Filed: Apr. 12, 2004

(51) Int. Cl.
*G06F 7/04* (2006.01)

(52) U.S. Cl. .............................................. 726/6; 726/10

(58) Field of Classification Search ................. 713/126, 713/156, 169
See application file for complete search history.

(56) References Cited

U.S. PATENT DOCUMENTS

| | | | |
|---|---|---|---|
| 6,170,060 B1 * | 1/2001 | Mott et al. .................... | 726/29 |
| 6,865,673 B1 * | 3/2005 | Nessett et al. ............... | 713/155 |
| 6,959,382 B1 * | 10/2005 | Kinnis et al. ................ | 713/170 |
| 2002/0013898 A1 * | 1/2002 | Sudia et al. ................. | 713/155 |
| 2004/0093492 A1 * | 5/2004 | Daude et al. ................ | 713/156 |
| 2005/0010757 A1 * | 1/2005 | Bosler ........................ | 713/156 |

\* cited by examiner

*Primary Examiner*—Nasser Moazzami
*Assistant Examiner*—Carlton V Johnson
(74) *Attorney, Agent, or Firm*—Hickman Palermo Truong & Becker LLP

(57) ABSTRACT

A method and apparatus for verifying configuration changes for network devices using digital signatures are disclosed. In one approach, a method comprises the computer-implemented steps of receiving trust information defining one or more trusted signatories; receiving configuration information comprising a hostname, one or more configuration directives for a host associated with the hostname, and one or more digital signatures of the hostname and configuration directives; attempting to verify the one or more digital signatures based on the trust information; and applying the configuration directives to a network element only when the one or more digital signatures are verified successfully.

54 Claims, 5 Drawing Sheets

METHOD FOR VERIFYING CONFIGURATION CHANGES OF NETWORK DEVICES USING DIGITAL SIGNATURES

FIELD OF THE INVENTION

The present invention generally relates to management of computer networks. The invention relates more specifically to techniques for verifying proposed changes in the configuration of a network device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks typically comprise interconnected routers, switches, and other network infrastructure elements, which are collectively termed "network devices." The management of computer networks often involves changing the configuration of one or more network devices by issuing one or more directives to the devices through an interface that is provided by the devices. An improper or unauthorized configuration change can disable the devices or cause harm to the network. Therefore, network administrators wish to have a way to require a network device to authenticate the source of a configuration change before accepting the configuration change.

Further, there is a need for multiple verifiable levels of authorization for a configuration change on a device, as a result of two recognized threats to networks in the foregoing context. The first threat is that a malicious or unauthorized party ("attacker") may gain access to authentication information for a single authorized user. The second threat is that an authorized user may abuse his or her authority.

The first threat, in which an attacker gains access to authentication information of a single user, can occur in numerous ways. For example, the attacker might obtain the password of an authorized individual simply by visual observation as the authorized individual enters the password. Other cases include dictionary attacks on the protected network element, as well as eavesdropping on an unprotected connection. The use of smart "one-time password" tokens and encryption has mitigated some of these attacks; however, if the attacker has the token and the password, he or she can access the protected network element.

The second threat involves a user who has the correct authorization to access a function of a network element, but misuses that authorization. Presently there is no known mechanism to allow review of changes on the device. Simple password mechanisms to provide such review are insufficient, because there is no present mechanism for associating a password with a particular block or portion of configuration requiring review.

Other past approaches have other drawbacks or shortcomings. For example, the network management system known as CiscoWorks 2000/Resource Management Essentials (RME), from Cisco Systems, Inc., San Jose, Calif., has a form of chain-of-approval checking. However, all such changes must be made through RME, and cannot be made on the device itself.

Passwords generally do not provide any indication of what was approved, but just that something was approved. For instance, a person can call and request a password for an approval for a trivial change, when in fact the person is about to make a catastrophic change.

The TACACS, TACACS+, Radius, and Diameter protocols provide a means for centralized password management. TACACS+ allows for authorization of specific commands, but does not provide for assurance of what is being changed.

One-time passwords (OTPs) allow for a password to only be used once. For example, the SafeWord password generator from Secure Computing Corporation, Roseville, Minn., can generate one-time passwords that may be authenticated by a server-side element. However, conventional use of one-time passwords does not associate the password with a particular network element configuration operation or set of operations.

Pretty Good Privacy (PGP), commercially implemented by Network Associates, Santa Clara, Calif., and implemented in an open-source project known as GPG, provides a set of message formats that allow for communication of public/private key pairs and messages that use them. SHA-1 is a secure hash algorithm, but it has not been used to address the needs identified above.

Digital signatures provide for a verifiable means to determine that one or more individuals authenticate some data. The Diffie-Hellman approach and the RSA algorithm provide two means of implementing digital signatures for a variety of purposes. Use of digitally signed operating system images for network devices, but not configuration commands, configuration files, or subsets of configuration files, has been used in prior approaches. The TRIPWIRE program only verifies the integrity of a system, and can identify changes that were made to a system, but it does not authorize changes to a system. In addition, TRIPWIRE cannot provide authentication of users with multiple levels of authority.

Digitally signed and verified updates of DNS (TSIG) have been used in one approach, but these do not use a multi-level authorization mechanism. This approach was used to provide signed PGP messages to the InterNIC as an authorization mechanism for DNS updates. However, this approach used a single signature and a single level of authorization.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
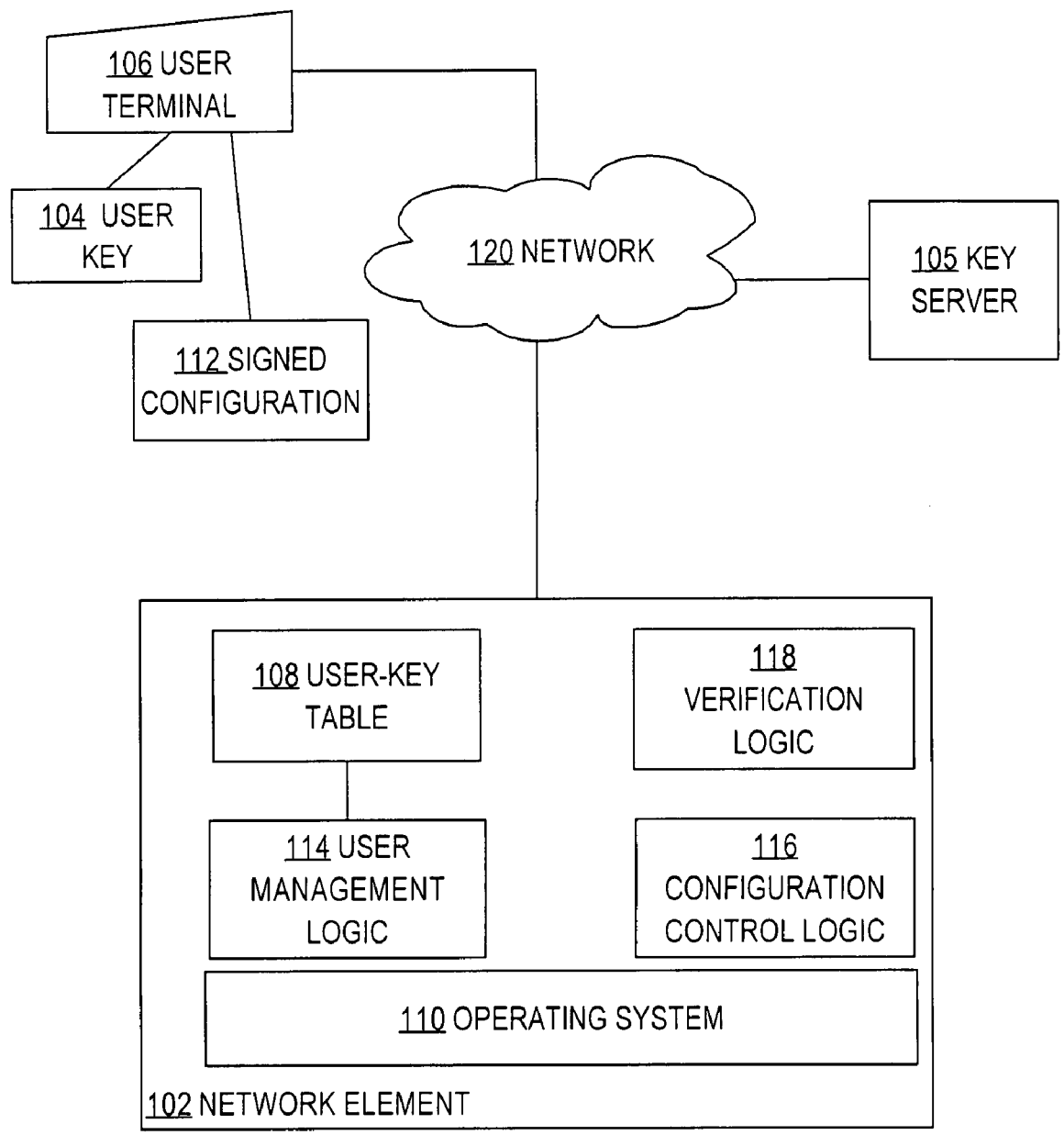
FIG. 1 is a block diagram that illustrates an overview of an apparatus for verifying configuration changes for network devices using digital signatures.

A method and apparatus for verifying configuration changes for network devices using digital signatures is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Implementations of Method and Apparatus for Verifying Configuration Changes for Network Devices Using Digital Signatures
    2.1 Structural Overview
    2.2 Functional Overview
    2.3 Approach for Preventing Replay Attacks
    2.4 Other Embodiments and Benefits of Various Embodiments
3.0 Implementation Mechanisms—Hardware Overview
4.0 Extensions and Alternatives

---

1.0 General Overview

The needs identified in the foregoing Background, and other needs and objects that will become apparent for the following description, are achieved in the present invention, which comprises, in one aspect, a method, comprising the computer-implemented steps of receiving trust information defining one or more trusted signatories; receiving configuration information comprising a hostname, one or more configuration directives for a network element host associated with the hostname, and one or more digital signatures of the hostname and configuration directives; attempting to verify the one or more digital signatures based on the trust information; and applying the configuration directives to a network element only when the one or more digital signatures are verified successfully.

In one embodiment, a method comprises the computer-implemented steps of: receiving trust information defining one or more trusted signatories; receiving configuration information comprising a hostname, one or more configuration directives for a host network element associated with the hostname, and one or more digital signatures of the hostname and configuration directives; attempting to verify the one or more digital signatures based on the trust information; applying the configuration directives to a network element only when the one or more digital signatures are verified successfully.

In this embodiment, the method further comprises the step of: verifying that the one or more digital signatures is valid and that one or more principals respectively associated with the digital signatures have collective authority to perform the directives on the host.

In this embodiment, the method further comprises the steps of: receiving, in association with a particular configuration directive, security information defining a number of required signatures and required principals; applying the particular configuration directive only when the configuration information has the number of required signatures by the required principals.

In this embodiment, the method further comprises the steps of: receiving, in association with a particular configuration directive, security information defining a number of required signatures and required principals; applying the particular configuration directive only when the configuration information has the number of required signatures by the required principals and only upon successively validating all required signatures.

In this embodiment, the one or more digital signatures comprise a first digital signature of a first portion of the one or more configuration directives by a first user, a second digital signature of a second portion of the one or more configuration directives by a second user, and a third digital signature by a third user, wherein the third digital signature is applied to a resultant of the first digital signature and the second digital signature.

In other aspects, the invention encompasses a computer apparatus and a computer-readable medium configured to carry out the foregoing steps.

2.0 Example Implementations of Method and Apparatus for Verifying Configuration Changes for Network Devices Using Digital Signatures

2.1 Structural Overview

FIG. 1 is a block diagram that illustrates an overview of an apparatus for verifying configuration changes for network devices using digital signatures. A user terminal 106 is communicatively coupled, directly or indirectly through one or more networks 120, to a network element 102. User terminal 106 represents any process, machine, or system that can enter or apply configuration changes to the network element 102. For example, user terminal 106 is a personal computer, workstation, terminal, process, application, or other software element. Network 120 is any combination of processing elements that can communicate with one another, and may be implemented as a local area network, wide area network, one or more internetworks, or a combination thereof. Network 120 may include network element 102.

Network element 102 comprises any element of network infrastructure such as a router or switch. Network element 102 executes or hosts an operating system 110 that includes or controls one or more agents, daemons, applications or services. In one embodiment, user management logic 114, configuration control logic 116, and verification logic 118 are accessible to, associated with or incorporated into operating system 110. User management logic 114 can access a user-key table 108.

The functions of user management logic 114, configuration control logic 116, verification logic 118, and user-key table 108 are described further herein. Generally, however, user management logic 114 comprises instructions for creating public keys, creating user records, creating user groups consisting of multiple users, and storing the public keys in user-key table 108 in association with user identifying information. Configuration control logic 116 comprises instructions for configuring network element 102 to require—as a condition for parsing and applying one or more configuration directives—one or more digital signatures by one or more particular users during a particular time period. Verification logic 118 comprises instructions for verifying a digital signature based on a public key of a user who generated the digital signature. User-key table 108 associates public keys with user identifying information.

In one embodiment, a user key 104 is associated with, hosted by or stored by user terminal 106. User key 104 is the public key portion of a public key-private key pair that are created by user terminal 106 for a particular user thereof, and used for public key cryptography functions as further described herein. In another embodiment, user key 104 is stored in a key server 105 that is accessible to user terminal 106 and network element 102; for example, the key server 105 may participate in network 120. In these embodiments, as part of the functions described further herein, user key 104 is loaded into user-key table 108 in association with information identifying a particular user. In yet another embodiment, user key 104 is stored in user-key table 108 of network element 102 at the time that the user key is created.

User terminal 106 also may be communicatively coupled to an access server or AAA server for the purpose of performing authentication of users of the user terminal 106. For example, when a user of user terminal 106 initially attempts to log in to network element 102 for the purpose of entering configuration changes, the user is redirected to an AAA server that prompts the user to enter a username and password. Upon receiving the username and password, the AAA authenticates the information against a database of trusted user information. If authentication is successful, the user is permitted to access network element 102. Because the elements and processes described in this paragraph are conventional, they are omitted from FIG. 1 for clarity, but may be used in embodiments as an adjunct to the techniques described herein.

2.2 Functional Overview

According to one embodiment, digital signatures are used to verify both the authenticity of a requested configuration change and that a signing party is authorized to implement the requested configuration change. One or more digital signatures are applied to text that represents directives to a device to change its configuration. Prior to applying the configuration change, a device verifies that the signatures are valid, and that the principals in the signatures have a combined authority to make the configuration change.

A configuration change may consist of that which is located in a router "config" database, or a command that causes such configurations to be modified, erased, or overridden.

Authorization may involve any of the following steps: (a) a single required signature for a particular change; (b) multiple signatures for a particularly sensitive change; (c) multiple signatures for a change made by an apprentice.

The public keys of the signatories may be stored on the device or retrieved through Radius, Diameter, TACACS+, or another authentication protocol. Public keys may take the form of X.509 certificates or a more simplified public key that is created using PGP or its open-source equivalent, GPG.

In one approach, a group of digital signatures is used in combination to authenticate a configuration for a network element. In another approach, one or more digital signatures is used in combination with another authentication mechanism, such as TACACS+, to provide a multi-level authorization process for some or all of a network element configuration.

In one embodiment, the approaches herein can prevent an individual from making a configuration change that could cripple a network element, even when the individual is otherwise authorized to make the change. For example, the approaches herein are useful to prevent unauthorized or malicious network element configuration changes by a disgruntled or inexperienced employee of an enterprise or service provider that owns or operates the network element. This result may be achieved, in one embodiment, through implementation of a multi-level authorization model that uses multiple digital signatures, or a single digital signature in combination with TACACS+ or another authentication protocol, and public key cryptography to confirm that only the authorized change is made, only on the set of network elements for which the change is authorized, only at the authorized time of the change and without replay, and only by the correct combination of signatures.

The disclosed approaches can be used in combination with, and complement, digital signing of network element images. For purposes of consistency, in one embodiment the digital signature formats (e.g., PGP, GPG, X.509, etc.) are the same.

Figure 2:
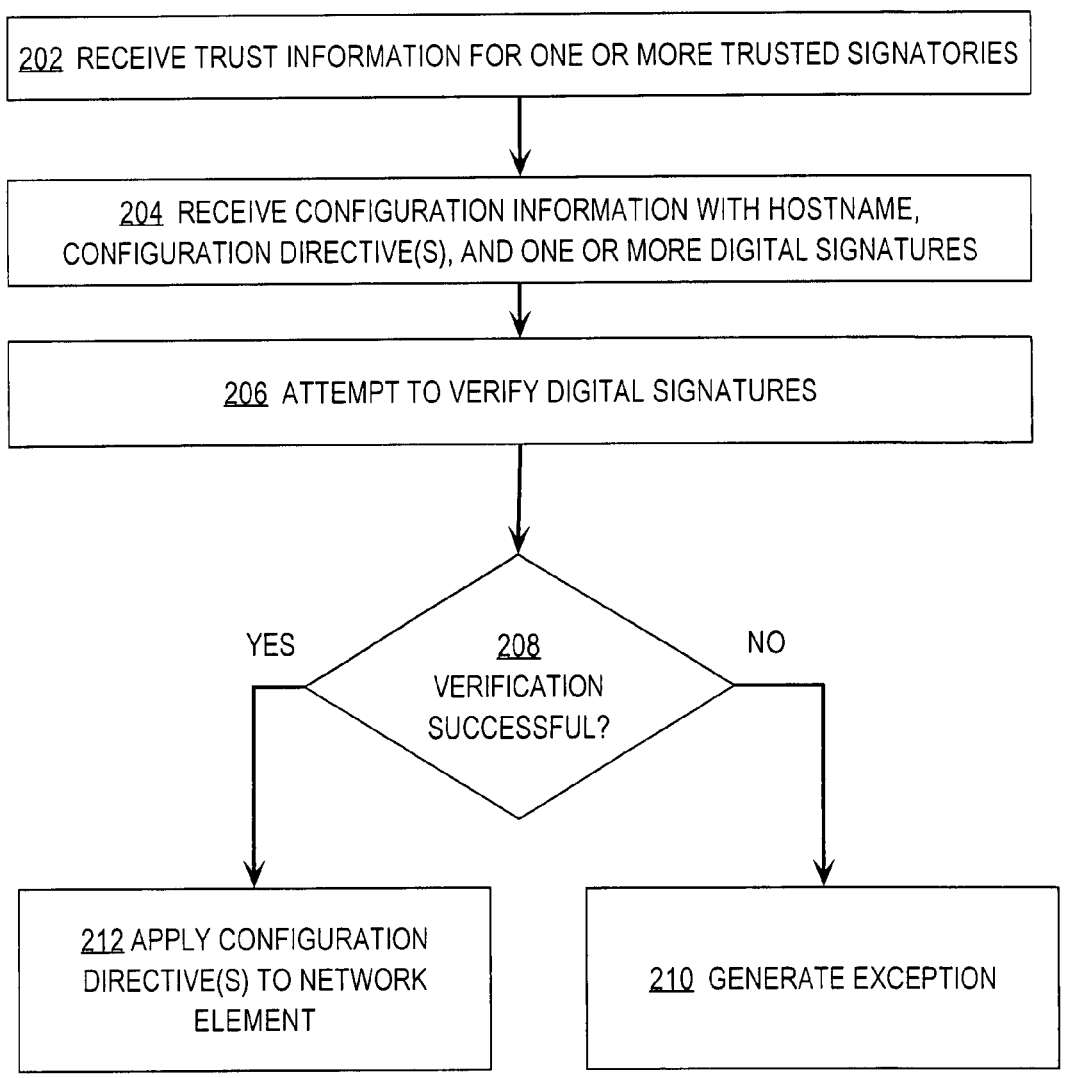
FIG. 2 is a flow diagram that illustrates a high level overview of one embodiment of a method for verifying configuration changes for network devices using digital signatures.

FIG. 2 is a flow diagram that illustrates a high level overview of one embodiment of a method for verifying configuration changes for network devices using digital signatures.

In step 202, trust information for one or more trusted signatories is received. A first aspect of step 202 involves providing a network element with keys associated with parties who may potentially provide signed configurations to the network element, so that the network element can hash, decrypt, or verify the digital signatures. A second aspect of step 202 may involve providing the network element with information about which configuration directives, if received by the network element, must carry a valid digital signature, without which the network element cannot apply the configuration directives.

In one example implementation of the first aspect, a public key, associated with a party that may issue signed configuration in the future, is received. The public key may be received as part of a digital certificate, through a messaging mechanism involving communication with key server 105, or through a key configuration command.

Processing logic for such a key configuration command may form part of user management logic 114. For example, in one embodiment that is implemented in a router or switch that uses a command-line interface that features an executive (exec) mode and a configuration (config) mode, such as the Cisco 2600 Series Routers, user management logic 114 can process an exec-level user management command having the syntax:

router# signature user create followed by a PGP signature block as defined in RFC 1991. In response, user management logic 114 creates a new user record in user-key table 108. If user management logic 114 determines that the PGP block does not contain a valid user key, an error is returned.

User management logic 114 may also provide instructions for processing a command having the syntax:

router# signature no user {keyID} where keyID is a unique identifier of a key. In an embodiment, this command deletes a user with the listed keyId.

User management logic 114 may also provide instructions for processing a command having the syntax:

router# signature [no] group {group-name} {keyId} {keyId ... } where group-name is the name of a user group. In an embodiment, this command creates or deletes a user group, and also may be used to delete a keyId from a group.

User management logic 114 may also provide instructions for processing a command having the syntax:

router# show signature-users

This command displays a list of zero or more users that have been previously created using the "signature user" command. Similarly, user management logic 114 may also provide instructions for processing a command having the syntax:

router# show signature-groups

This command displays a list of zero or more user groups. In an embodiment, the "show signature-users" command shows only those users that are created locally. Users need not be local to be in a signature-group. Users and groups created with the above commands are stored securely in non-volatile memory.

In one implementation of the second aspect of step 202, network element 102 is informed about which commands require digital signatures, by whom, and during which time period, using the configuration modes, submodes and commands of Table 1:

TABLE 1

CONFIGURATION CONTROL SPECIFICATION

[no] signature-required
[no] command-group {number}
    [no] command-name {exec-parse-tree exec name}
    [no] config-command {config-parse-tree name}
    [no] when-required from {timespec} to {timespec}
    [no] key-group {groupId} {groupId . . . }

Typically, in an embodiment, a configuration control command would include one "signature-required" block followed by any number of "command-group" blocks that identify commands requiring signatures. Each such command-group block may identify, as indicated above, an exec-mode command name and/or a configuration command. Optionally the command-group block may identify a time period during which a signature is required. Each command-group block may specify a key group identifying a required signer.

Processing logic of network element 102 must find at least one valid signature from each member of the groupId in order to parse the command. This command-group will have no effect unless a key-group is defined. Multiple command-names and config-commands can be specified in a single group. The time period specified using the "when-required" keyword is optional.

Key groups contain one or more keys that are stored either locally or on a key server. Both forms of storage may be defined for a key-group. Key groups may be defined using the submodes of Table 2:

TABLE 2

CONFIGURATION CONTROL SUBMODES FOR KEY GROUPS

[no] key-group {groupId}
    [no] pgp-key-server {URL}
    [no] local-key-group {groupName}

In table 2, "groupId" is an identifier of a key group, and may be an arbitrary numeric value, pointer, or Uniform Resource Locator (URL) identifying a network resource. The groupId value is followed by and associated with one or more definitions of key servers or local key groups. A key server defined in the command, such as key server 105, may be a PGP server, X.509 certificate authority, etc. Alternatively, a list of distinguished names associated with a certificate authority may be specified. Thus, when the "pgp-key-server" parameter is specified, an associated URL value identifies a network location of a PGP key server that holds user keys. Additionally or alternatively, the "local-key-group" option specifies a name of a key group in storage on a network element, such as network element 102.

In step 204, configuration information comprising a hostname, one or more configuration directives, and one or more digital signatures is received. For example, user terminal 106 provides signed configuration 112, which is signed using user key 104, to network element 102. In an embodiment, prior to step 204, a user logs into network element 102 and the user is authenticated using an external AAA server over TACACS+ or a similar protocol; this approach may provide a threshold level of configuration security. The signed configuration 112 may comprise one or more configuration directives. For example, the configuration directives may comprise instructions or commands that conform to a command-line interface (CLI) that can be parsed and executed by network element 102.

Figure 3A:
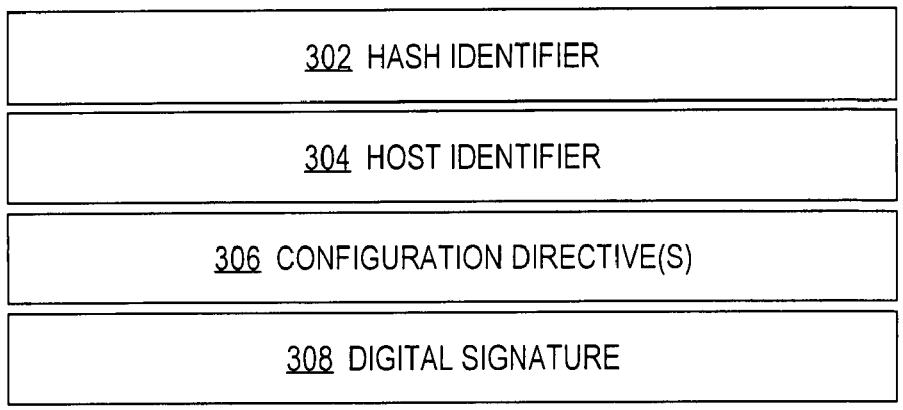
FIG. 3A is a block diagram that illustrates a first example of a signed configuration.
Figure 3B:
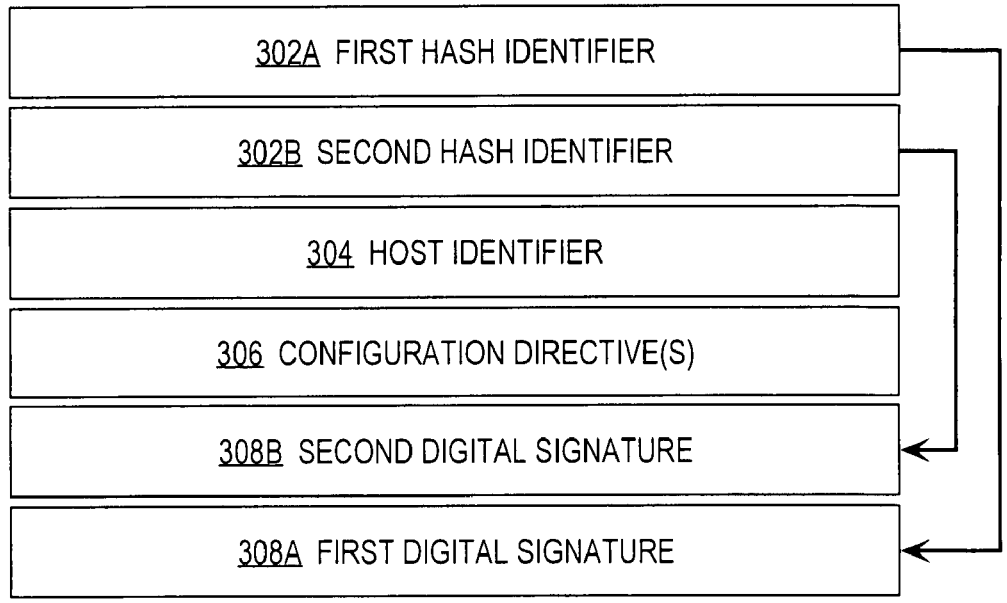
FIG. 3B is a block diagram that illustrates a second example of a signed configuration.

Specific example formats for signed configuration 112 are described further herein with respect to FIG. 3A, FIG. 3B. According to one embodiment that uses a CLI with a config-mode for entering configuration directives and an executive mode for non-configuration device commands, the input of signed configurations and commands is provided using by specifying a "signed" option in an exec-level "configure" command, which causes the network element to recognize the beginning of a signed block of configuration. In an embodiment that uses PGP for digital signatures, the beginning of such a block comprises the following text: -----BEGIN PGP SIGNED MESSAGE-----. This portion contains all signed configuration, and is terminated as follows: -----BEGIN PGP SIGNATURE-----. The following portion contains digital signature material, which is read until the following line is encountered: -----END PGP SIGNATURE-----.

In another embodiment, an exec-level command "signature execute" also may be provided, which receives takes input in the same format as above, except that the contents are signed exec-level commands instead of config-mode configuration directives.

The user who is then-currently logged-in to user terminal 106 or network element 102 need not provide the digital signature of the signed configuration 112. Thus, user key 104 need not correspond to a then-current user of user terminal 106 or network element 102. In one embodiment, network element 102 is configured to know the signatures that it can trust, by storing trusted user keys in user-key table 108. In another embodiment, network element 102 requests a policy server to provide trusted user keys, or to verify the digital signature that is applied to the signed configuration. For example, network element 102 may be communicatively coupled to an authentication, authorization and access (AAA) server and may request, using an appropriate protocol such as RADIUS, TACACS, TACACS+, Diameter, etc., the AAA server to verify the signed configuration or provide a user key.

In step 206, an attempt is made to verify the digital signatures that are received in step 204. For example, verification logic 118 uses conventional public-key cryptography techniques to verify the digital signatures based on user key 104, or a public key for a user of user terminal 106 that is retrieved from user-key table 108. Verification may comprise applying a one-way hash function to the configuration directives that are provided as part of the signed configuration 112, using the user's public key as one input to the hash function, and determining whether the resulting hash output matches the signature that is provided as part of the signed configuration 112.

In step 208, a test is performed to determine if verification is successful. If so, and only if so, control passes to step 212 in which the one or more configuration directives are applied to the network element. However, if verification fails for any of the digital signatures, then in step 210 an exception is generated. Generating an exception in step 210 may involve generating an alarm, publishing an event on an event bus, issuing an error message in a command-line interface, throwing an error using a programmatic mechanism, or using any other notification mechanism.

FIG. 3A is a block diagram that illustrates a first example of a signed configuration, and FIG. 3B is a block diagram that illustrates a second example of a signed configuration. Referring first to FIG. 3A, a signed configuration 301A may comprise a hash identifier 302, host identifier 304, one or more configuration directives 306, and a digital signature 308. The hash identifier 302 specifies a one-way hash algorithm that is used to generate the digital signature 308. The host identifier 304 identifies a router, switch or other network element to which the configuration directives 306 are to be applied.

In one embodiment, the PGP or GPG signed message format is used for the signed configuration 301A. For example, signed configuration 301A may comprise the material shown in Table 3:

TABLE 3

EXAMPLE SIGNED CONFIGURATION

| | |
|---|---|
| 1 | -----BEGIN PGP SIGNED MESSAGE----- |
| 2 | Hash: SHA1 |
| 3 | routername="router.example.com" |
| 4 | |
| 5 | interface ethernet 0 |
| 6 | ip access-group 101 in |
| 7 | ip address 10.1.1.1 255.255.255.0 |
| 8 | |
| 9 | -----BEGIN PGP SIGNATURE----- |
| 10 | Version: GnuPG v1.2.1 (GNU/Linux) |
| 11 | |
| 12 | iD8DBQE/TKZoboAPZxNuPLgRArDmAKC8//m65Ynq2b14y |
| 13 | YNbq8DZQ+rPhgCeO0PSxdJp5HTC00UHVFya6KQ7vAs= |
| 14 | =WP8k |
| 15 | -----END PGP SIGNATURE----- |

In this example, line 2 corresponds to hash identifier 302 and identifies the SHA-1 hash algorithm. Line 3 corresponds to host identifier 304 and identifies a router named "router.example.com." Lines 5-7 correspond to the one or more configuration directives 306, and comprise CLI commands for the specified router. In this example lines 5-7 represent only a portion of a complete configuration for a network element. Lines 12-14 comprise a digital signature 308 of an individual signature who has signed the portion of the configuration. As described above, there is no requirement for the signature to correspond to the person who is logged in to network element 102. All that is required is that the device be configured to either know the signatures that it can trust, or to pass the verification process off to a policy server that can make decisions for an arbitrary number of signatures or individuals.

The hostname of the intended target of the configuration is provided, as host identifier 304, to indicate that the proposed configuration change is applicable to the specific device, and not to some other device even though the signature may be valid. In an alternate approach, a cryptographically secure hash of the configuration directives is created, and the hash is encrypted using a device public key. In this approach, only the affected device can properly verify the signed configuration. Host identifier 304 may comprise multiple host names or configured host groups, to allow a single configuration update to be applied to multiple devices.

FIG. 3B illustrates a second example of a signed configuration. Multiple authorizations are accommodated using the techniques herein in one of three ways. In a first approach, only a second party, such as a second-level manager of the person who intends to apply a configuration change, signs the configuration. In a second approach, two individuals sign the configuration. In various embodiments, any number of individuals may sign a configuration.

In one multiple-signature approach, two persons sign the configuration in series.

In another multiple-signature approach, the second person signs a copy containing the signature of the first. For example, as shown in FIG. 3B, a signed configuration 301B may comprise a first hash identifier 302A, a second hash identifier 302B, a host identifier 304, one or more configuration directives 306, a second digital signature 308B, and a first digital signature 308A. First hash identifier 302A identifies a hash algorithm used to produce the first digital signature 308A, and second hash identifier 302B identifies a hash algorithm used to produce the second digital signature 308B. Thus, in this approach, the signatures are essentially nested. Table 4 presents a specific example of this approach.

TABLE 4

EXAMPLE MULTIPLE-SIGNED CONFIGURATION

| | |
|---|---|
| 1 | -----BEGIN PGP SIGNED MESSAGE----- |
| 2 | Hash: SHA1 |
| 3 | |
| 4 | ------BEGIN PGP SIGNED MESSAGE----- |
| 5 | Hash: SHA1 |
| 6 | |
| 7 | hostname: Heater |
| 8 | ! |
| 9 | boot system flash:c3620-jk9o3s-mz.122-2.T1.bin |
| 10 | ! |
| 11 | |
| 12 | ------BEGIN PGP SIGNATURE----- |
| 13 | Version: GnuPG v1.2.1 (GNU/Linux) |
| 14 | |
| 15 | iD8DBQE/X6d9boAPZxNuPLgRAs+ |
| | 2AKDxSaaku7RbguYT1RzhOYEdya2 |
| 16 | bZgCg9gsL2h5b0hvDCEns6+9A1w6axRo==qtxv |
| 17 | ------END PGP SIGNATURE----- |
| 18 | -----BEGIN PGP SIGNATURE----- |
| 19 | Version: GnuPG v1.2.1 (GNU/Linux) |
| 20 | |
| 21 | iD8DBQE/ |
| | X6kqprbvk7fdB88RAvXyAJ9Op3DrFTxuUINvibpOLwRdm0Y |
| 22 | 1MQCffUy46FvZ/C5IwMJYSU4a98QK3jI==is9i |
| 23 | -----END PGP SIGNATURE---- |

In this example, an individual signed the configuration, and then the individual's manager signed the resultant.

2.3 Approach for Preventing Replay Attacks

In one embodiment, to prevent replay attacks, network element 102 is configured with a specified period of time during which a signed configuration is valid. A digital signature 308 must contain a date value for this purpose. During the specified period of time, the network element generates a secure hash of a configuration change upon receiving a signed configuration. If an identical hash is stored, the configuration change is not processed and an event is logged. Otherwise, the configuration change is processed and the hash is stored for a period of time slightly greater than the configured validity of the update.

Figure 4:
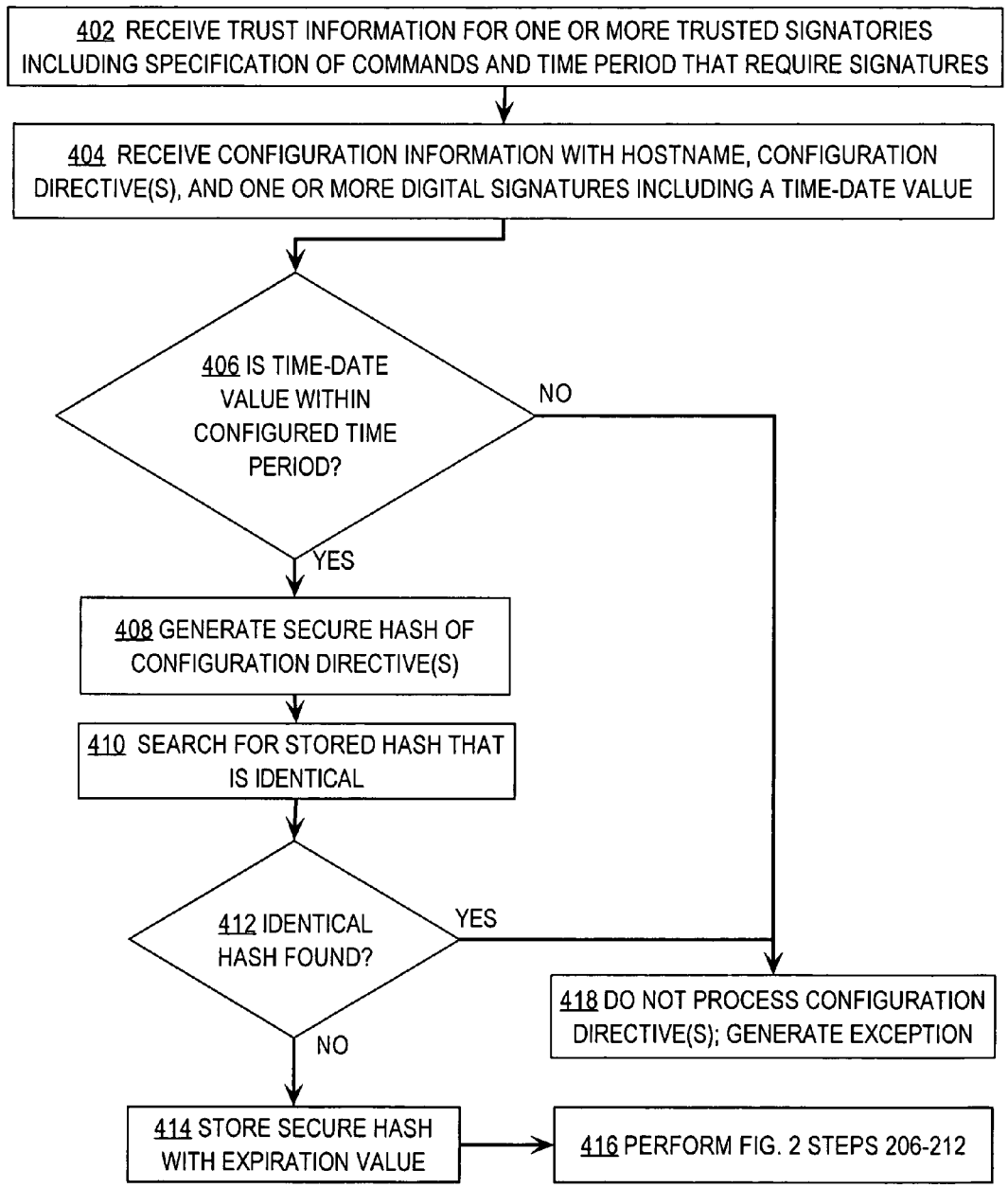
FIG. 4 is a flow diagram of that illustrates a high level overview of one embodiment of a method for verifying configuration changes for network devices using digital signatures with a process for preventing replay attacks.

FIG. 4 is a flow diagram of that illustrates a high level overview of one embodiment of a method for verifying configuration changes for network devices using digital signatures with a process for preventing replay attacks. Instructions in verification logic 118 may implement the process of FIG. 4.

In step 402, trust information is received. Step 402 may involve the same process as described above for step 202 of FIG. 2, except that in step 402 a time period value is also received. For example, a user at user terminal 106 issues a configuration control command of the form specified above to network element 102, and includes the "when-required" option with time-date values that indicate a particular time period. Configuration control logic 116 of network element 102 stores the time period information in association with other values of the configuration control command in a MIB, in user-key table 108, or in other appropriate storage.

In step 404, signed configuration information is received, including a time-date value. Step 404 may involve receiving a signed configuration as described above for step 204 of FIG. 2, but additionally including a time-date value. Generally, the time-date value represents a time at which the configuration was signed, or a time at which a user sent the signed configuration. For example, a system clock of user terminal 106 may provide a time-date value that is included in the signed configuration.

In step 406, a test is performed to determine if the time-date value received in the signed configuration of step 404 is within the time period that was configured in step 402. Network Time Protocol (NTP) may be used in order to synchronize clocks of the user terminal 106 and network element 102. However, if the time period configured in step 402 is sufficiently long, and the date-time value provided in step 404 is not close to an endpoint of that time period, then only coarse clock accuracy may be needed.

If the date-time value associated with the digital signature is within the configured time period, then in step 408, a secure hash of the configuration directives in the signed configuration is generated. In step 410, a search is performed to determine if the network element has an identical hash in storage. In one embodiment, hashes of applied configurations are stored in non-volatile memory to prevent replays after reboot, and such memory is searched at step 410. If an identical hash is found, as tested at step 412, then the configuration directives are not processed, as shown in step 418, and an exception is generated.

If no identical hash is found, then in step 414 the secure hash is stored, in association with an expiration value, in non-volatile memory. When the SHA-1 hash algorithm is used, each secure hash comprises a 64-byte value, such that relatively little storage is required to store a reasonable number of has values. In one embodiment, the expiration value is selected to extend slightly after the end of the time period configured in step 402. Use of an expiration value enables logic in a network element to discard old hash values for the purpose of storage management.

2.4 Other Embodiments and Benefits of Various Embodiments

The approaches herein also permit a user to submit multiple configuration changes as a batch. The signatures of the multiple configurations need not be the same; they only need to verify correctly. This approach is appropriate, for example, when different individuals are responsible for different portions of the configuration, but all changes represented in the configuration are to be made at the same time. In another approach, different individuals sign different portions of a configuration, and a senior manager signs both of the resultants with one or more separate signatures.

The approaches herein enable single or multiple public key signatures are used to validate and authorize configuration changes on a device. One embodiment provides for a multiple level authentication mechanism for device configurations. Unlike prior approaches, embodiments bound the portion of configuration authorized for change, and allow for verification and review of device configuration changes on the device prior to execution in an automated fashion.

Further, embodiments may significantly limit the ability of insiders to destroy or maliciously modify configurations, or make other unauthorized changes, by enabling authorization based on two or more authorized parties. In one embodiment, the ability of an intruder to make configuration changes to devices is far more limited than in prior approaches, because interception of a single password is not sufficient to overcome the need to provide multiple valid, required signatures.

Certain embodiments also differ from prior approaches in that they use digital signatures to operate the running state of a device, and can be implemented as an input filter that otherwise does not interrupt existing process flow; for example, there is no need to issue prompt messages for input of a password in the middle of a change. Certain embodiments improve upon prior approaches by preventing replay attacks of secured configuration changes. In one embodiment, use of the SHA-1 hash rather than a serial number allows for aggregation of configuration changes, so that the same update may be applied across multiple devices.

Embodiments may be used in any network element that stores a configuration. Within a network element operating system, any command that requires a signature can be augmented to allow for the receipt of the signature. If the signature is verified, then the change is made; if the signature is not verified, the change is discarded, an error is generated, and an event is logged.

In another embodiment, similar processes are applied to changes to a configuration database as maintained by a network element or network management system. The configuration change is bounded in markers that denote the beginning and ending of signed configuration. After the end markers, a signature block is received. If the combined signatures have the requisite authority to make the change, then the configuration block is sent to the parser. On other architectures, a process identifies what is changing, including filenames and offsets. The named files and any associated commands are then signed and transmitted. An attempt to verify the signature is performed, and if the signature is valid, the command is executed.

Embodiments may be used in a broad spectrum of network devices and solutions. Embodiments are specifically useful in large enterprise and service provider environments in which multiple levels of authorization are currently used in other places.

3.0 Implementation Mechanisms

Hardware Overview

Figure 5:
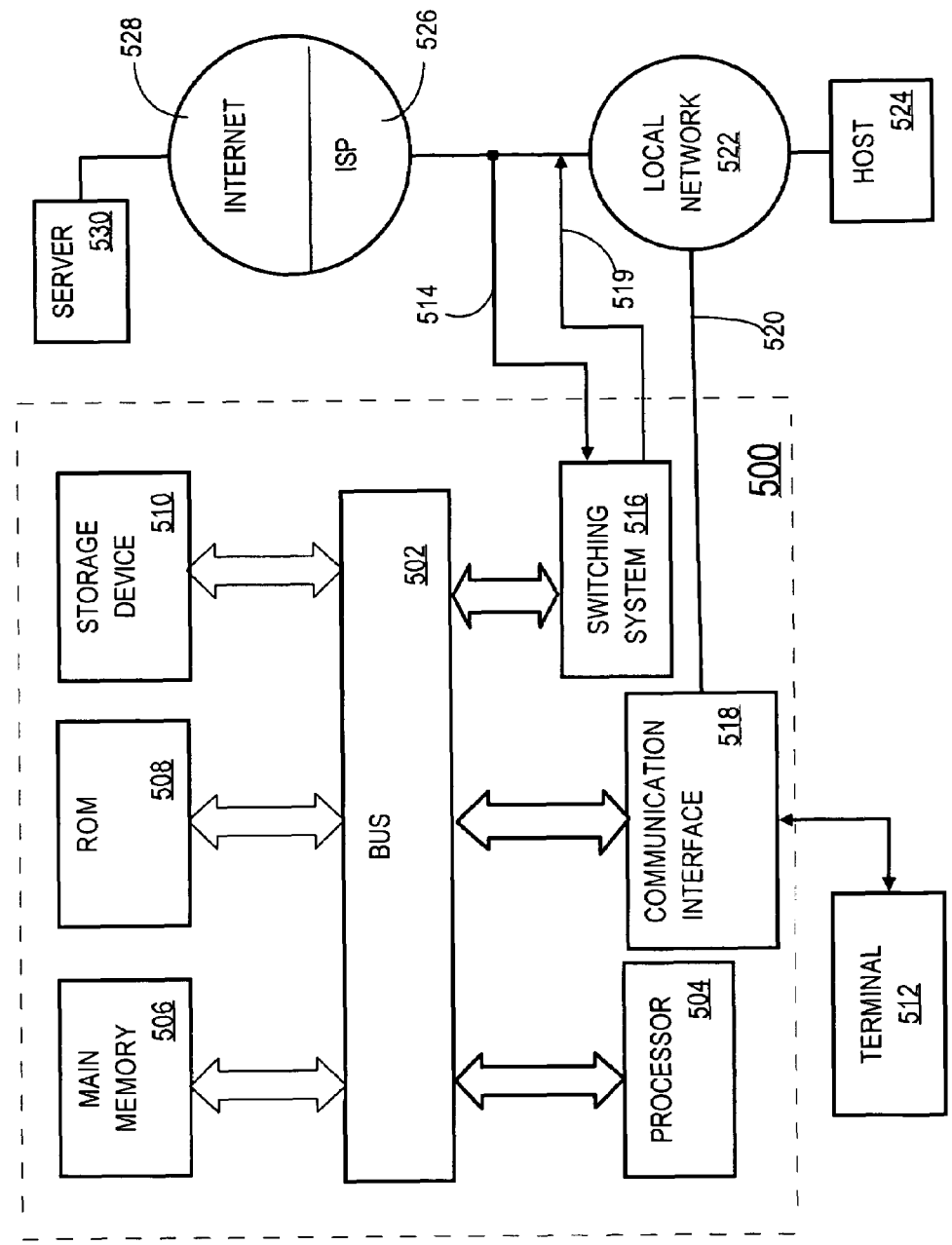
FIG. 5 is a block diagram that illustrates a computer system upon which an embodiment may be implemented, in the form of an example router.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for verifying configuration changes for network devices using digital signatures. According to one embodiment of the invention, a method and apparatus for verifying configuration changes for network devices using digital signatures are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for verifying configuration changes for network devices using digital signatures as described herein.

Processor 504 may execute the received code as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented steps of:
    receiving trust information defining one or more trusted signatories;
    receiving, in association with a particular configuration directive, security information defining a number of required signatures and required principals;
    receiving configuration information comprising a hostname, one or more configuration directives for a host network element associated with the hostname, and two or more digital signatures of the hostname and the one or more configuration directives;
    wherein the configuration information includes the particular configuration directive;
    wherein the two or more digital signatures comprise a first digital signature of a first portion of the one or more configuration directives by a first user, and a second digital signature of a second portion of the one or more configuration directives by a second user;
    receiving signature group data representing a collective authority and comprising a first identifier that identifies the first user responsible for the first portion of the one or more configuration directives and a second identifier that identifies the second user responsible for the second portion of the one or more configuration directives;
    wherein the configuration information specifies that the first portion and the second portion of the one or more configuration directives are to be applied to the host network element at the same time;
    attempting to verify the two or more digital signatures based on the trust information, the signature group data, and the security information;
    verifying that the two or more digital signatures are valid and that two or more principals respectively associated with the two or more digital signatures have the collective authority to perform the one or more configuration directives on the host network element;
    applying the one or more configuration directives to the host network element only when the two or more digital signatures are verified successfully;
    wherein applying the one or more configuration directives comprises applying the particular configuration directive only when the configuration information has the number of required signatures by the required principals;
    wherein the steps of the method are performed by the host network element.

2. A method as recited in claim 1, wherein applying the particular configuration directive comprises applying the particular configuration directive only when the configuration information has the number of required signatures by the required principals and only upon successively validating all required signatures.

3. A method as recited in claim 1, wherein the two or more digital signatures use public key cryptography, and wherein public keys for the two or more digital signatures are stored on the host.

4. A method as recited in claim 1, wherein the two or more digital signatures use public key cryptography, wherein public keys for the two or more digital signatures are stored on a key server and retrieved from the key server as part of attempting to validate the two or more digital signatures.

5. A method as recited in claim 1, wherein the two or more digital signatures use public key cryptography, and wherein public keys for the two or more digital signatures are received in a digital certificate and extracted from the digital certificate as part of attempting to validate the two or more digital signatures.

6. A method, comprising the computer-implemented steps of:
    receiving trust information defining one or more trusted signatories;
    receiving configuration control information that includes a time period during which a valid digital signature is required for applying one or more particular configuration directives;
    receiving configuration information comprising a hostname, one or more configuration directives for a host network element associated with the hostname, one or more digital signatures of the hostname and the one or more configuration directives, and a date-time value;
    receiving signature group data representing a collective authority and comprising a first identifier that identifies a first user responsible for a first portion of the one or more configuration directives and a second identifier that identifies a second user responsible for a second portion of the one or more configuration directives;
    wherein the configuration information specifies that the first portion and the second portion of the one or more configuration directives are to be applied to the host network element at the same time;
    determining if the date-time value is within the time period;
    determining if the one or more configuration directives have been previously received during the time period; and
    only when the date-time value is within the time period and the one or more configuration directives have not been previously received during the time period, attempting to verify the one or more digital signatures based on the trust information and the signature group data, and applying the one or more configuration directives to the host network element only when the one or more digital signatures are verified successfully;
    wherein the steps of the method are performed by the host network element.

7. A method as recited in claim 6, wherein the step of determining if the one or more configuration directives have been previously received during the time period comprises the steps of:
    generating a secure hash of the one or more configuration directives;
    determining if the secure hash is found in memory.

8. A method as recited in claim 6, wherein the step of determining if the one or more configuration directives have been previously received during the time period comprises the steps of:
    generating a secure hash of the one or more configuration directives;
    determining if the secure hash is found in non-volatile memory.

9. A method as recited in claim 6, further comprising the step of storing the secure hash in non-volatile memory, in association with an expiration value, when the date-time value is within the time period and the one or more configuration directives have not been previously received during the time period.

10. A method as recited in claim 6, further comprising the steps of:

verifying that the one or more digital signatures are valid and that one or more principals respectively associated with the one or more digital signatures have the collective authority to perform the one or more configuration directives on the host network element.

11. A method as recited in claim 6, further comprising the steps of:
receiving, in association with a particular configuration directive, security information defining a number of required signatures and required principals;
applying the particular configuration directive only when the configuration information has the number of required signatures by the required principals.

12. A method as recited in claim 6, further comprising the steps of:
receiving, in association with a particular configuration directive, security information defining a number of required signatures and required principals;
applying the particular configuration directive only when the configuration information has the number of required signatures by the required principals and only upon successively validating all required signatures.

13. A method as recited in claim 6, wherein the one or more digital signatures use public key cryptography, and wherein public keys for the one or more digital signatures are stored on the host.

14. A method as recited in claim 6, wherein the one or more digital signatures use public key cryptography, wherein public keys for the one or more digital signatures are stored on a key server and retrieved from the key server as part of attempting to validate the one or more digital signatures.

15. A method as recited in claim 6, wherein the one or more digital signatures use public key cryptography, and wherein public keys for the one or more digital signatures are received in a digital certificate and extracted from the digital certificate as part of attempting to validate the one or more digital signatures.

16. A method for verifying configuration changes for network devices using digital signatures, comprising the computer-implemented steps of:
receiving a public key for a user of the network devices;
receiving configuration control information that includes a time period during which a valid digital signature is required for applying one or more particular configuration directives to a specified network device;
receiving configuration information comprising a hostname, one or more configuration directives for the specified network device associated with the hostname, one or more digital signatures of the hostname and the one or more configuration directives, and a date-time value;
receiving signature group data representing a collective authority and comprising a first identifier that identifies a first user responsible for a first portion of the one or more configuration directives and a second identifier that identifies a second user responsible for a second portion of the one or more configuration directives;
wherein the configuration information specifies that the first portion and the second portion of the one or more configuration directives are to be applied to the specified network device at the same time;
determining if the date-time value is within the time period;
determining if the one or more configuration directives have been previously received during the time period, by generating a secure hash of the one or more configuration directives and determining if the secure hash is found in memory; and
only when the date-time value is within the time period and the one or more configuration directives have not been previously received during the time period, performing the steps of:
attempting to verify the one or more digital signatures based on using the signature group data and generating a secure hash of the one or more configuration directives using the public key and comparing the secure hash to the one or more digital signatures,
and applying the one or more configuration directives to the specified network device only when the one or more digital signatures are verified successfully;
wherein the steps of the method are performed by the specified network device.

17. A method as recited in any of claim 16, wherein the one or more digital signatures comprise a first digital signature of the one or more configuration directives by a first user, and a second digital signature by a second user, wherein the second digital signature is applied to a resultant of the first digital signature.

18. A method as recited in any of claim 6 or 16, wherein the one or more digital signatures comprise a first digital signature of the first portion of the one or more configuration directives by the first user, a second digital signature of the second portion of the one or more configuration directives by the second user, and a third digital signature by a third user, wherein the third digital signature is applied to a resultant of the first digital signature and the second digital signature.

19. A computer-readable volatile or non-volatile medium storing one or more sequences of instructions for verifying configuration changes for network devices using digital signatures, which instructions, when executed by one or more processors, cause the one or more processors to carry out the steps of:
receiving trust information defining one or more trusted signatories;
receiving, in association with a particular configuration directive, security information defining a number of required signatures and required principals;
receiving configuration information comprising a hostname, one or more configuration directives for a host network element associated with the hostname, and two or more digital signatures of the hostname and the one or more configuration directives;
wherein the configuration information includes the particular configuration directive;
wherein the two or more digital signatures comprise a first digital signature of a first portion of the one or more configuration directives by a first user, and a second digital signature of a second portion of the one or more configuration directives by a second user;
receiving signature group data representing a collective authority and comprising a first identifier that identifies the first user responsible for the first portion of the one or more configuration directives and a second identifier that identifies the second user responsible for the second portion of the one or more configuration directives;
wherein the configuration information specifies that the first portion and the second portion of the one or more configuration directives are to be applied to the host network element at the same time;
attempting to verify the two or more digital signatures based on the trust information, the signature group data, and the security information;
verifying that the two or more digital signatures are valid and that two or more principals respectively associated with the two or more digital signatures have the collective authority to perform the one or more configuration directives on the host network element;

applying the one or more configuration directives to the host network element only when the two or more digital signatures are verified successfully;

wherein applying the one or more configuration directives comprises applying the particular configuration directive only when the configuration information has the number of required signatures by the required principals.

20. A computer-readable volatile or non-volatile medium as recited in claim 19, wherein the second digital signature is applied to a resultant of the first digital signature.

21. A computer-readable volatile or non-volatile medium as recited in claim 19, wherein the two or more digital signatures further comprise a third digital signature by a third user, wherein the third digital signature is applied to a resultant of the first digital signature and the second digital signature.

22. An apparatus for verifying configuration changes for network devices using digital signatures, comprising:
  means for receiving trust information defining one or more trusted signatories;
  means for receiving, in association with a particular configuration directive, security information defining a number of required signatures and required principals;
  means for receiving configuration information comprising a hostname, one or more configuration directives for a host network element associated with the hostname, and two or more digital signatures of the hostname and the one or more configuration directives;
  wherein the configuration information includes the particular configuration directive;
  wherein the two or more digital signatures comprise a first digital signature of a first portion of the one or more configuration directives by a first user, and a second digital signature of a second portion of the one or more configuration directives by a second user;
  means for receiving signature group data representing a collective authority and comprising a first identifier that identifies the first user responsible for the first portion of the one or more configuration directives and a second identifier that identifies the second user responsible for the second portion of the one or more configuration directives;
  wherein the configuration information specifies that the first portion and the second portion of the one or more configuration directives are to be applied to the host network element at the same time;
  means for attempting to verify the two or more digital signatures based on the trust information, the signature group data, and the security information;
  means for verifying that the two or more digital signatures are valid and that two or more principals respectively associated with the two or more digital signatures have the collective authority to perform the one or more configuration directives on the host network element;
  means for applying the one or more configuration directives to the host network element only when the two or more digital signatures are verified successfully;
  wherein the means for applying the one or more configuration directives comprise means for applying the particular configuration directive only when the configuration information has the number of required signatures by the required principals.

23. An apparatus as recited in claim 22, wherein the second digital signature is applied to a resultant of the first digital signature.

24. An apparatus as recited in claim 22, wherein the two or more digital signatures further comprise a third digital signature by a third user, wherein the third digital signature is applied to a resultant of the first digital signature and the second digital signature.

25. An apparatus as recited in claim 22, wherein the means for applying the particular configuration directive comprise means for applying the particular configuration directive only when the configuration information has the number of required signatures by the required principals and only upon successively validating all required signatures.

26. An apparatus as recited in claim 22, wherein the two or more digital signatures use public key cryptography, and wherein public keys for the two or more digital signatures are stored on the host network element.

27. An apparatus as recited in claim 22, wherein the two or more digital signatures use public key cryptography, wherein public keys for the two or more digital signatures are stored on a key server and retrieved from the key server as part of attempting to validate the two or more digital signatures.

28. An apparatus as recited in claim 22, wherein the two or more digital signatures use public key cryptography, and wherein public keys for the two or more digital signatures are received in a digital certificate and extracted from the digital certificate as part of attempting to validate the two or more digital signatures.

29. An apparatus for verifying configuration changes for network devices using digital signatures, comprising:
  a network interface that is coupled to the data network for receiving one or more packet flows therefrom;
  a processor;
  one or more stored sequences of instructions which, when executed by the processor, cause the processor to carry out the steps of:
    receiving trust information defining one or more trusted signatories;
    receiving, in association with a particular configuration directive, security information defining a number of required signatures and required principals;
    receiving configuration information comprising a hostname, one or more configuration directives for a host network element associated with the hostname, and two or more digital signatures of the hostname and the one or more configuration directives;
    wherein the configuration information includes the particular configuration directive;
    wherein the two or more digital signatures comprise a first digital signature of a first portion of the one or more configuration directives by a first user, and a second digital signature of a second portion of the one or more configuration directives by a second user;
    receiving signature group data representing a collective authority and comprising a first identifier that identifies the first user responsible for the first portion of the one or more configuration directives and a second identifier that identifies the second user responsible for the second portion of the one or more configuration directives;
    wherein the configuration information specifies that the first portion and the second portion of the one or more configuration directives are to be applied to the host network element at the same time;
    attempting to verify the two or more digital signatures based on the trust information, the signature group data, and the security information;
    verifying that the two or more digital signatures are valid and that two or more principals respectively associated with the two or more digital signatures have the collective authority to perform the one or more configuration directives on the host network element;

applying the one or more configuration directives to the host network element only when the two or more digital signatures are verified successfully;

wherein applying the one or more configuration directives comprises applying the particular configuration directive only when the configuration information has the number of required signatures by the required principals.

30. An apparatus as recited in claim 29, wherein the second digital signature is applied to a resultant of the first digital signature.

31. An apparatus as recited in claim 29, wherein the two or more digital signatures further comprise a third digital signature by a third user, wherein the third digital signature is applied to a resultant of the first digital signature and the second digital signature.

32. A computer-readable volatile or non-volatile medium as recited in claim 19, wherein the instructions that cause the one or more processors to perform the step of applying the particular configuration directive comprise instructions which, when executed by the one or more processors, cause the one or more processors to perform the step of applying the particular configuration directive only when the configuration information has the number of required signatures by the required principals and only upon successively validating all required signatures.

33. A computer-readable volatile or non-volatile medium as recited in claim 19, wherein the two or more digital signatures use public key cryptography, and wherein public keys for the two or more digital signatures are stored on the host network element.

34. A computer-readable volatile or non-volatile medium as recited in claim 19, wherein the two or more digital signatures use public key cryptography, wherein public keys for the digital signatures are stored on a key server and retrieved from the key server as part of attempting to validate the two or more digital signatures.

35. A computer-readable volatile or non-volatile medium as recited in claim 19, wherein the two or more digital signatures use public key cryptography, and wherein public keys for the two or more digital signatures are received in a digital certificate and extracted from the digital certificate as part of attempting to validate the two or more digital signatures.

36. An apparatus as recited in claim 29, wherein the instructions that cause the processor to perform the step of applying the particular configuration directive comprise instructions which, when executed by the one or more processors, cause the processor to perform the step of applying the particular configuration directive only when the configuration information has the number of required signatures by the required principals and only upon successively validating all required signatures.

37. An apparatus as recited in claim 29, wherein the two or more digital signatures use public key cryptography, and wherein public keys for the two or more digital signatures are stored on the host network element.

38. An apparatus as recited in claim 29, wherein the two or more digital signatures use public key cryptography, wherein public keys for the two or more digital signatures are stored on a key server and retrieved from the key server as part of attempting to validate the two or more digital signatures.

39. An apparatus as recited in claim 29, wherein the two or more digital signatures use public key cryptography, and wherein public keys for the two or more digital signatures are received in a digital certificate and extracted from the digital certificate as part of attempting to validate the two or more digital signatures.

40. A computer-readable volatile or non-volatile medium storing one or more sequences of instructions which, when executed by one or more processors, cause the one or more processors to perform steps comprising:

receiving trust information defining one or more trusted signatories;

receiving configuration control information that includes a time period during which a valid digital signature is required for applying one or more particular configuration directives;

receiving configuration information comprising a hostname, one or more configuration directives for a host network element associated with the hostname, one or more digital signatures of the hostname and the one or more configuration directives, and a date-time value;

receiving signature group data representing a collective authority and comprising a first identifier that identifies a first user responsible for a first portion of the one or more configuration directives and a second identifier that identifies a second user responsible for a second portion of the one or more configuration directives;

wherein the configuration information specifies that the first portion and the second portion of the one or more configuration directives are to be applied to the host network element at the same time;

determining if the date-time value is within the time period;

determining if the one or more configuration directives have been previously received during the time period; and only when the date-time value is within the time period and the one or more configuration directives have not been previously received during the time period, attempting to verify the one or more digital signatures based on the trust information and the signature group data, and applying the one or more configuration directives to the host network element only when the one or more digital signatures are verified successfully.

41. The computer-readable volatile or non-volatile medium as recited in claim 40, wherein the instructions that cause determining if the one or more configuration directives have been previously received during the time period comprise instructions which, when executed by the one or more processors, cause the one or more processors to perform the steps of:

generating a secure hash of the one or more configuration directives;

determining if the secure hash is found in memory.

42. The computer-readable volatile or non-volatile medium as recited in claim 40, wherein the instructions that cause determining if the one or more configuration directives have been previously received during the time period comprise instructions which, when executed by the one or more processors, cause the one or more processors to perform the steps of:

generating a secure hash of the one or more configuration directives;

determining if the secure hash is found in non-volatile memory.

43. The computer-readable volatile or non-volatile medium as recited in claim 40, wherein the one or more sequences of instructions further comprise instructions which, when executed by the one or more processors, cause the one or more processors to perform the step of storing the secure hash in non-volatile memory, in association with an expiration value, when the date-time value is within the time period and the one or more configuration directives have not been previously received during the time period.

44. The computer-readable volatile or non-volatile medium as recited in claim 40, wherein the one or more sequences of instructions further comprise instructions which, when executed by the one or more processors, cause the one or more processors to perform the step of:
verifying that the one or more digital signatures are valid and that one or more principals respectively associated with the one or more digital signatures have the collective authority to perform the one or more configuration directives on the host network element.

45. The computer-readable volatile or non-volatile medium as recited in claim 40, wherein the one or more sequences of instructions further comprise instructions which, when executed by the one or more processors, cause the one or more processors to perform the steps of:
receiving, in association with a particular configuration directive, security information defining a number of required signatures and required principals;
applying the particular configuration directive only when the configuration information has the number of required signatures by the required principals.

46. The computer-readable volatile or non-volatile medium as recited in claim 40, wherein the one or more sequences of instructions further comprise instructions which, when executed by the one or more processors, cause the one or more processors to perform the steps of:
receiving, in association with a particular configuration directive, security information defining a number of required signatures and required principals;
applying the particular configuration directive only when the configuration information has the number of required signatures by the required principals and only upon successively validating all required signatures.

47. The computer-readable volatile or non-volatile medium as recited in claim 40, wherein the one or more digital signatures use public key cryptography, and wherein public keys for the one or more digital signatures are stored on the host network element.

48. The computer-readable volatile or non-volatile medium as recited in claim 40, wherein the one or more digital signatures use public key cryptography, wherein public keys for the one or more digital signatures are stored on a key server and retrieved from the key server as part of attempting to validate the one or more digital signatures.

49. The computer-readable volatile or non-volatile medium as recited in claim 40, wherein the one or more digital signatures use public key cryptography, and wherein public keys for the one or more digital signatures are received in a digital certificate and extracted from the digital certificate as part of attempting to validate the one or more digital signatures.

50. The computer-readable volatile or non-volatile medium as recited in claim 40, wherein the one or more digital signatures comprise a first digital signature of the one or more configuration directives by the first user, and a second digital signature by the second user, wherein the second digital signature is applied to a resultant of the first digital signature.

51. The computer-readable volatile or non-volatile medium as recited in claim 40, wherein the one or more digital signatures comprise a first digital signature of the first portion of the one or more configuration directives by the first user, a second digital signature of the second portion of the one or more configuration directives by the second user, and a third digital signature by a third user, wherein the third digital signature is applied to a resultant of the first digital signature and the second digital signature.

52. A computer-readable volatile or non-volatile medium storing one or more sequences of instructions for verifying configuration changes for network devices using digital signatures, which instructions, when executed by one or more processors, cause the one or more processors to perform steps comprising:
receiving a public key for a user of the network devices;
receiving configuration control information that includes a time period during which a valid digital signature is required for applying one or more particular configuration directives to a specified network device;
receiving configuration information comprising a hostname, one or more configuration directives for the specified network device associated with the hostname, one or more digital signatures of the hostname and the one or more configuration directives, and a date-time value;
receiving signature group data representing a collective authority and comprising a first identifier that identifies a first user responsible for a first portion of the one or more configuration directives and a second identifier that identifies a second user responsible for a second portion of the one or more configuration directives;
wherein the configuration information specifies that the first portion and the second portion of the one or more configuration directives are to be applied to the specified network device at the same time;
determining if the date-time value is within the time period;
determining if the one or more configuration directives have been previously received during the time period, by generating a secure hash of the one or more configuration directives and determining if the secure hash is found in memory; and
only when the date-time value is within the time period and the one or more configuration directives have not been previously received during the time period, performing the steps of:
attempting to verify the one or more digital signatures based on using the signature group data and generating a secure hash of the one or more configuration directives using the public key and comparing the secure hash to the one or more digital signatures, and
applying the one or more configuration directives to the specified network device only when the one or more digital signatures are verified successfully.

53. The computer-readable volatile or non-volatile medium as recited in claim 52, wherein the one or more digital signatures comprise a first digital signature of the one or more configuration directives by the first user, and a second digital signature by the second user, wherein the second digital signature is applied to a resultant of the first digital signature.

54. The computer-readable volatile or non-volatile medium as recited in claim 52, wherein the one or more digital signatures comprise a first digital signature of the first portion of the one or more configuration directives by the first user, a second digital signature of the second portion of the one or more configuration directives by the second user, and a third digital signature by a third user, wherein the third digital signature is applied to a resultant of the first digital signature and the second digital signature.

* * * * *